Patented Nov. 1, 1938

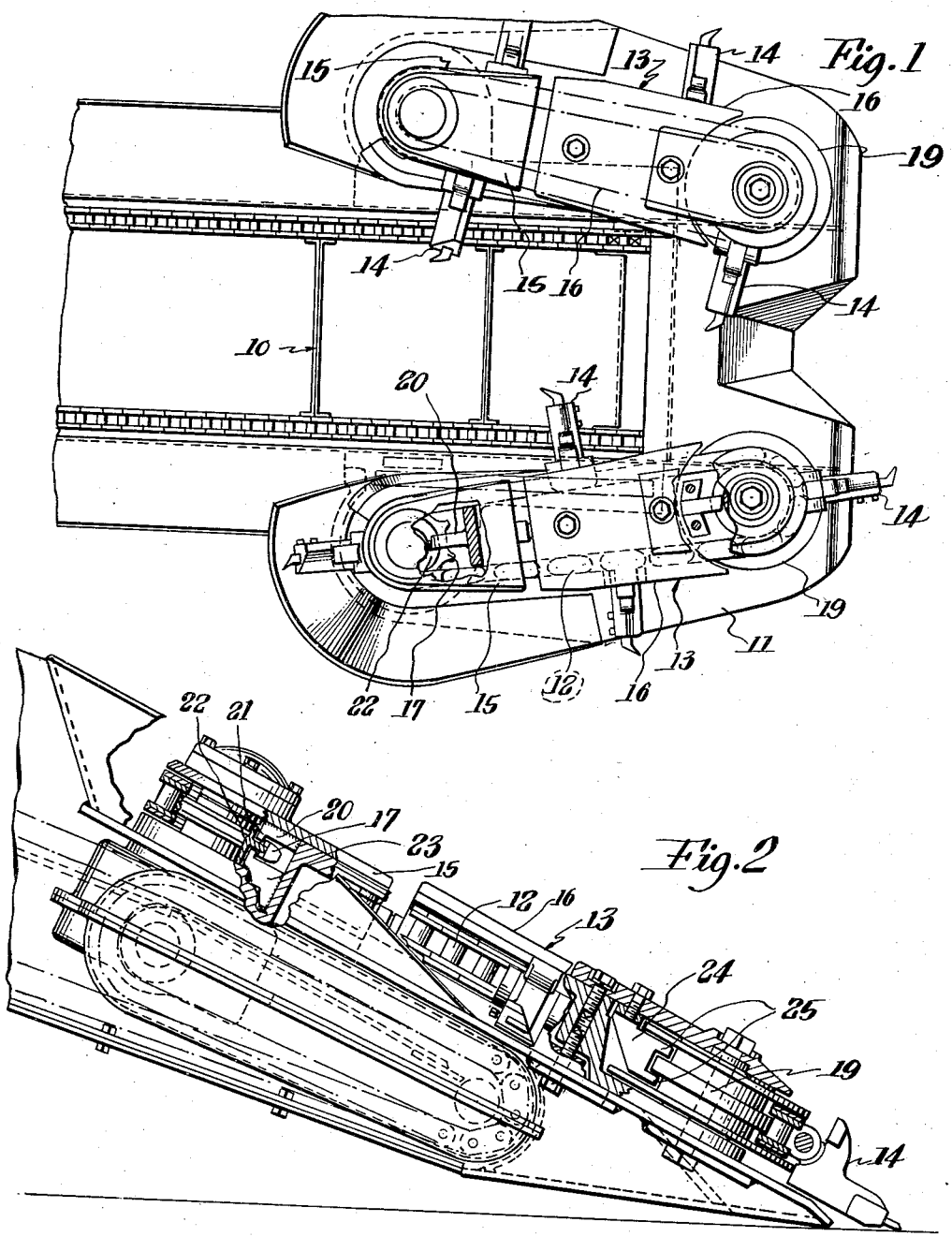

2,135,141

UNITED STATES PATENT OFFICE 2,135,141

LOADING MACHINE

Frederick B. Miller, Chicago, Ill., assignor to Goodman Manufacturing Company, Chicago, Ill., a corporation of Illinois Application May 14, 1937, Serial No. 142,533

6 Claims. (Cl. 198—8)

This invention relates to improvements in loading machines of the type adapted to gather and load coal from the ground, and more particularly to an improved construction of gathering head for initially picking up the loose material and loading it onto a flight conveyer for discharge on a mine car or the like.

More specifically the present invention is an improvement in the general forms of gathering heads disclosed in a prior application Serial No. 50,861 filed by Frank Cartlidge on November 21, 1935.

In loading coal underground there is a tendency for the fine coal to be collected by the gathering chains and carried along the chain guides and collect between the chain and teeth and hub of the drive sprocket, and between the chain and hub of the lower direction changing device about which the chain turns. This causes undue wear of the gathering chain and in many cases tightening of the chain to such an extent that it breaks or stalls the machine.

Among the objects of my invention are to remedy this difficulty by providing a means which will rake the fine coal from the drive sprockets and lower direction changing devices and thus prevent the packing of this coal between said sprockets and direction changing devices and the gathering chains.

Other objects of my invention will appear from time to time as the accompanying specification proceeds.

My invention may be more clearly understood with reference to the accompanying drawing wherein:

Figure 1 is a top plan view of a gathering head for a loading machine with parts broken away and in section in order to show one form in which my invention may be embodied; and Figure 2 is a side elevation of the device shown in Figure 1 with certain parts broken away and shown in substantially longitudinal section.

In the drawing my invention is shown as being embodied in a gathering head of the type illustrated in the aforementioned application of Frank Cartlidge, the details of which gathering head will only be described in so far as is necessary to make my present invention readily understandable. The gathering and loading mechanism, as herein shown, includes an inclined flight conveyer generally indicated by reference character 10, which may be mounted on and extend from a track-mounted truck (not shown) for engagement with the ground. Said conveyer has an apron 11 extending along opposite sides thereof and forwardly therefrom across the forward end thereof to the ground. Gathering chains 12 are mounted for orbital movement above said apron in chain guides 13. Said chain guides extend along opposite sides of the conveyer from a point disposed forwardly of the forward end thereof so that laterally projecting gathering arms 14, 14 mounted on said chains may extend beyond the forward end of said apron and pick up material from the ground.

The chain guides 13, 13 are of an ordinary adjustable construction to permit adjustment of the tension of the gathering chains 12, 12. Said chain guides have a channeled guide formed along their periphery and each include an upper portion 15 and a lower portion 16 which may be adjustably moved with respect to said upper portion.

A drive sprocket 17 is journaled in the upper portion 15 of each chain guide 13 and meshes with and forms a means for driving the endless chain 12 about its respective guide. Said sprocket may be driven from the flight conveyer 10 in a manner which is clearly shown and described in the aforementioned application of Frank Cartlidge, so said drive connection will not herein be shown or described in detail. A direction changing device 19 is journaled in the lower portion 16 of each chain guide, adjacent the lower end thereof, and forms a means about which the chain turns at its lower turning point.

Referring now in particular to the novel features of my invention and the means for preventing an accumulation of fine material between the chains 12, 12 and the teeth and hubs of the sprockets 17, 17 and between said chains and the direction changing devices 19, 19. Raking means are provided on the chain guides 13, 13 for raking material from said sprockets and direction changing devices as they leave their respective chains. Said raking means, as herein shown, includes a raking member 20 secured to the inside of the upper portion 15 of each chain guide 13 and extending inwardly along the teeth of the sprocket 17. Said raking member has a projecting end 21 which projects into an annular recess 22 formed in said sprocket. The entering edge of said raking member is closely adjacent the hub of said sprocket and said edge diverges from the hub of said sprocket at a slight angle to provide clearance and to prevent fouling (see Figure 1). In a like manner, a raking member 23 extends inwardly along the lower side of the teeth of the sprocket 17 to a position disposed closely adjacent the hub thereof.

Material is raked from the direction changing device 19 in a manner similar to which it is raked from the sprocket 17 by means of a raking member 24 secured to the inner side of the lower portion 16 of each chain guide 13. Said raking member has a central portion disposed closely adjacent the outer periphery of said direction changing device, and portions 25, 25 extending above and below the upper and lower sides of said direction changing device toward the hub thereof, in close proximity with respect thereto so as to prevent the accumulation of material thereon.

It will be seen from the foregoing that a simplified means of a novel construction has been provided for raking material from the teeth and hubs of the sprockets 17, 17 and from the direction changing devices 19, 19 to prevent it from packing between the teeth and hubs of said sprockets and direction changing devices and the gathering chains 12, 12 and thus minimize undue wear or tightening, or breakage of the chain.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim:

1. In a loading machine, a gathering element including a chain guide, an endless chain guided for orbital movement thereabout, gathering arms projecting laterally from said chain, a drive sprocket meshing with said chain and disposed at one end of said chain guide, and a rotatable direction changing device at the other end of said chain guide and forming a means about which said chain turns, and means to prevent material from packing between said chain and sprocket comprising a raking member secured to said chain guide adjacent the inner side thereof and extending towards and over the teeth of said sprocket in close relation with respect thereto to a position adjacent its hub, the inner edge of said raking member being at an open angle with respect to said hub to provide clearance therefor.

2. In a gathering conveyer, a channeled guide, an endless chain movable thereabout, a sprocket having a projecting hub, said sprocket being disposed at one end of said guide and meshing with said chain, and means to prevent material from packing between said chain and the hub of said sprocket comprising a raking member secured to said chain guide and having a portion extending towards and over and along the teeth of said sprocket in close relation with respect thereto and terminating at a scraping edge disposed closely adjacent the hub of said sprocket.

3. In a gathering conveyer, a channeled guide, an endless chain guided for movement thereabout, a sprocket having a projecting hub, said sprocket being disposed at one end of said guide and meshing with said chain, and means to prevent material from packing between said chain and the hub of said sprocket comprising a raking member secured to said chain guide between the runs of said chain and having a portion extending towards and over and along the teeth of said sprocket in close relation with respect thereto and terminating at a scraping edge disposed closely adjacent the hub of said sprocket, the end of said raking member adjacent the hub of said sprocket being cut away from the scraping edges thereof to diverge from the hub of said sprocket.

4. In a gathering conveyer, a channeled guide, an endless chain guided for movement thereabout, a rotatable direction changing device having a hub projecting from opposite sides thereof, said direction changing device being disposed at one end of said guide and having said chain trained therearound, and means to prevent material from packing between said chain and the hub of said direction changing device comprising a raking member disposed within said chain guide between the runs of said chain and including portions extending towards and over and along each side of said direction changing device in close relation with respect thereto, said portions terminating at scraping edges disposed closely adjacent and substantially parallel to the hub of said direction changing device.

5. In a gathering conveyer, a channeled guide, an endless chain guided for movement thereabout, a sprocket having a hub projecting from opposite sides thereof, said sprocket being disposed at one end of said guide and meshing with said chain, and means to prevent material from packing between said chain and the hub of said sprocket comprising a raking member secured to said chain guide between the runs of said chain and having a portion extending towards and over and along the teeth of said sprocket in close relation with respect thereto and terminating at a scraping edge disposed closely adjacent and substantially parallel to the hub of said sprocket, the ends of said portions adjacent the hub of said sprocket being cut away from the scraping edges thereof to diverge from the hub of said sprocket.

6. In a gathering conveyer, a chain guide, an endless chain guided for orbital movement thereabout, gathering arms projecting laterally from said chain, a drive sprocket meshing with said chain and disposed at one end of said chain guide, and a rotatable direction changing device at the other end of said chain guide and forming a means about which said chain turns, and means to prevent material from packing between said chain and said sprocket and direction changing device comprising raking members secured to said chain guide adjacent the inner side thereof and extending towards and over and along the sides of said sprocket and direction changing device in close relation with respect thereto to a position adjacent the hubs thereof, the inner edges of said raking members being at an open angle with respect to said hubs to provide clearance therefor.

FREDERICK B. MILLER.